(12) United States Patent
Lee et al.

(10) Patent No.: US 8,643,807 B2
(45) Date of Patent: Feb. 4, 2014

(54) BACK LIGHT UNIT AND LIQUID CRYSTAL DISPLAY INCLUDING THE SAME

(75) Inventors: Joo-Young Lee, Yongin (KR); Won-Il Lee, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 210 days.

(21) Appl. No.: 13/238,572

(22) Filed: Sep. 21, 2011

(65) Prior Publication Data

US 2012/0188482 A1    Jul. 26, 2012

(30) Foreign Application Priority Data

Jan. 25, 2011 (KR) .................. 10-2011-0007356

(51) Int. Cl.
*G02F 1/1335* (2006.01)
(52) U.S. Cl.
USPC ............... 349/65; 349/61; 349/62; 349/63; 349/64; 349/67; 362/600; 362/606; 362/607; 362/608
(58) Field of Classification Search
USPC ......... 349/61–65, 67; 362/600, 606, 607, 608
See application file for complete search history.

(56) References Cited

U.S. PATENT DOCUMENTS

| 8,322,904 B2 * | 12/2012 | Lee et al. ............... 362/613 |
| 2009/0256996 A1 | 10/2009 | Suzuki |
| 2012/0002441 A1 * | 1/2012 | Yabe et al. ................ 362/607 |

FOREIGN PATENT DOCUMENTS

| KR | 10-2005-0030723 A | 3/2005 |
| KR | 10-0764455 B1 | 9/2007 |
| KR | 10-2007-0096337 A | 10/2007 |

* cited by examiner

*Primary Examiner* — Jennifer Doan
(74) *Attorney, Agent, or Firm* — Knobbe, Martens Olson & Bear, LLP

(57) ABSTRACT

A backlight unit having improved luminance and reduced profile, and a liquid crystal display including the same are disclosed. In one embodiment, the backlight unit includes: i) a light source, ii) a light guiding plate including an incoming surface on which light generated from the light source is incident, an upper surface substantially perpendicularly extended with respect to the incoming surface, and a bottom surface arranged facing the upper surface and iii) an optical sheet formed on the light guiding plate. The upper surface of the light guiding plate includes a guiding surface, an incoming surface, and an emission surface sequentially arranged close to the incoming surface of the light guiding plate, and the optical sheet may be formed to cover the inclined surface and the guiding surface.

12 Claims, 4 Drawing Sheets

BACK LIGHT UNIT AND LIQUID CRYSTAL DISPLAY INCLUDING THE SAME

RELATED APPLICATIONS

This application claims priority to and the benefit of Korean Patent Application No. 10-2011-0007356 filed in the Korean Intellectual Property Office on Jan. 25, 2011, the entire contents of which are incorporated herein by reference.

BACKGROUND

1. Field

The described technology generally relates to a backlight unit and a liquid crystal display including the same.

2. Description of the Related Technology

A liquid crystal display (LCD) has advantages, such as slimness, lightness, and low power consumption, such that it replaces the existing cathode ray tube (CRT). As a result, LCDs have been prevalently used for midsize and large products such as a monitor and a TV and small-sized products, such as mobile phones, personal digital assistants (PDAs), and portable multimedia players (PMPs).

SUMMARY

One inventive aspect is a backlight unit in which luminance is improved by preventing loss of light due to an inclined portion of a light guiding plate while maintaining the slim thickness of the light guiding plate, and a liquid crystal display including the same.

Another aspect is a backlight unit which includes: a light source; a light guiding plate including an incoming surface on which light generated from the light source is incident, an upper surface perpendicularly extended with respect to the incoming surface, and a bottom surface arranged facing the upper surface; and an optical sheet formed on the light guiding plate. The upper surface of the light guiding plate includes a guiding surface, an incoming surface, and an emission surface sequentially arranged close to the incoming surface of the light guiding plate, and the optical sheet may be formed to cover the inclined surface and the guiding surface.

The optical sheet may be extended to cover at least a part of the upper surface of the light source.

The optical sheet may include a diffusion sheet and a prism sheet formed on the diffusion sheet.

The diffusion sheet may cover the entire upper surface of the light source and the prism sheet may cover a part of the upper surface of the light source.

The light source may be provided in plural, and the optical sheet may include a cut-out portion formed between the plurality of light sources.

The backlight unit may further include a reflection sheet arranged facing the bottom surface of the light guiding plate.

The light source may be a light emitting diode (LED).

Another aspect is a liquid crystal display which includes: a liquid crystal display panel; a backlight unit including a light source, a light guiding plate including an incoming surface on which light generated from the light source is incident, an upper surface perpendicularly extended with respect to the incident surface, and an optical sheet formed on a light guiding plate; and a receiving container receiving the liquid crystal display panel and the backlight unit. An upper surface of the light guiding plate includes a guiding surface, an inclined surface, and an emission surface sequentially arranged close to the incoming surface of the light guiding plate, the optical sheet is formed to cover the inclined surface and the guiding surface.

DETAILED DESCRIPTION

Figure 1:
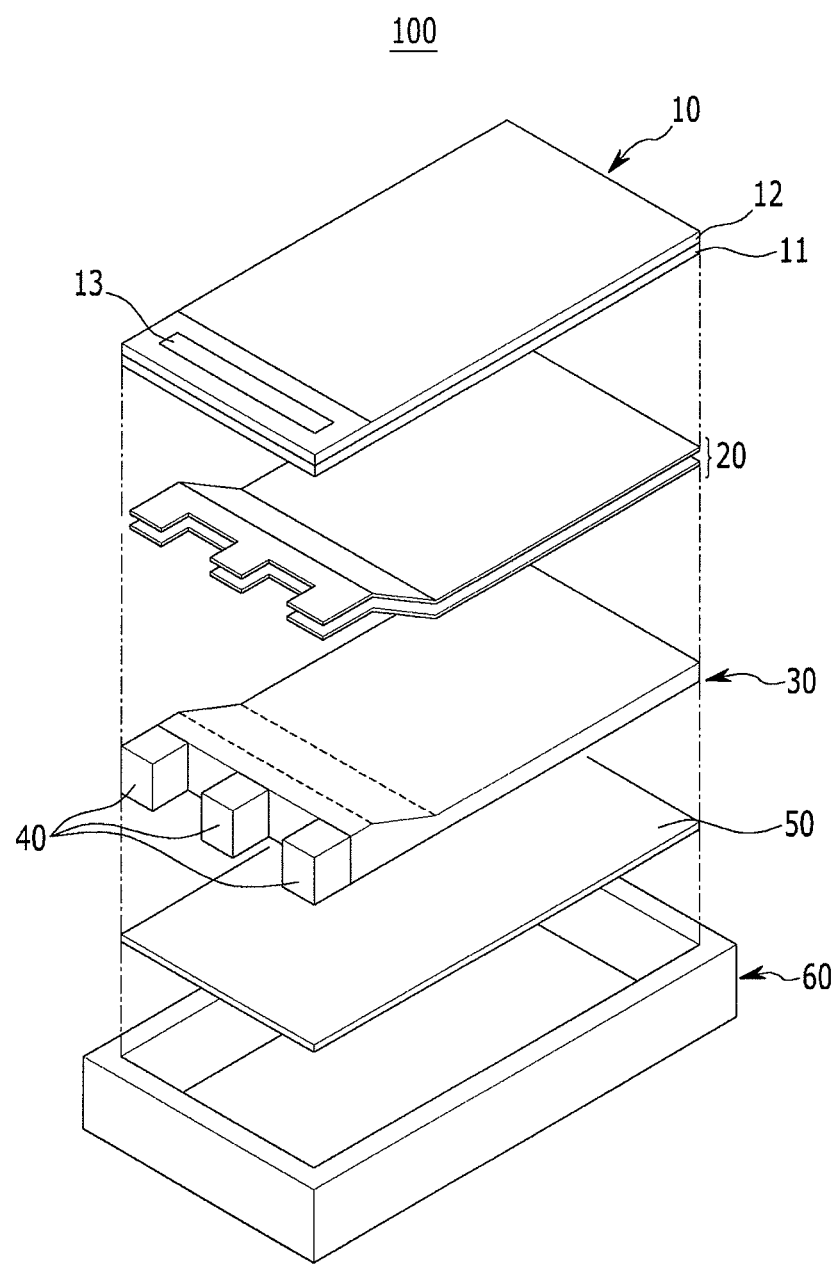
FIG. 1 is an exploded perspective view of a liquid crystal display according to an embodiment.

Generally, an LCD display drives a liquid crystal display panel using optical properties of liquid crystal, thereby displaying images. However, since the liquid crystal is not self-emissive, the display requires a separate light source.

Typically, a backlight unit is formed in a back surface of the liquid crystal display panel and includes a light source and a light guide panel receiving light emitted from the light source and diffusing the light. When light is irradiated to the liquid crystal display panel through the backlight assembly, images are displayed. A light emitting diode (LED) may be used for the light source of the backlight assembly. The LED may be located on one side surface of the light guide panel.

For a reduced profile of the entire device, the light guiding plate needs to be thin. However, there is a limit to reducing the thickness of the LED. Thus a configuration in which the thickness of an emission portion in the light guiding plate becomes thinner while maintaining the contact portion to the LED to be the same as that of the LED is adopted. Such a disparity in thickness can be resolved by connecting the incoming surface and the emitting surface through the inclined surface. However, a large amount of light loss occurs in the inclined surface due to the refraction angle of light. That angle changes due to the linearity of light and the refractive index of a material.

Embodiments will be described more fully hereinafter with reference to the accompanying drawings.

The drawings and description are to be regarded as illustrative in nature and not restrictive. Like reference numerals designate like elements throughout the specification. In addition, the size and thickness of each component shown in the drawings are arbitrarily shown for understanding and ease of description.

FIG. 1 is an exploded perspective view of a liquid crystal display (LCD) according to an embodiment.

Referring to FIG. 1, the LCD includes a liquid crystal display panel 10, a backlight unit, and a receiving container 60 receiving the liquid crystal display panel 10 and the backlight unit.

The liquid crystal display panel 10 includes a thin film transistor (TFT) substrate 11 and a color filter substrate 12 arranged facing each other, and a liquid crystal (not shown) is injected between the two substrates 11 and 12. In one embodiment, the TFT substrate 11 and the color filter substrate 12 are formed as a material such as glass.

A thin film transistor, a capacitor, and a pixel electrode are formed in the TFT substrate 11, and a gate electrode and a source electrode of the thin film transistor are respectively connected with the gate line and the data line, and the pixel electrode is connected to a drain electrode of the thin film transistor. Gate lines and data lines of the TFT substrate 11 are connected to a flexible printed circuit (FPC) (not shown) and an electric signal is input to the PFC such that an electric signal is input to the gate electrode and the source electrode of the thin film transistor. The thin film transistor is turned on or turned off according to the electric signal such that an electric signal for driving of liquid crystal is output to the drain electrode.

In the color filter substrate 12, a color filter where RGB pixels are formed and a common electrode formed with a transparent electrode such as indium tin oxide (ITO) and indium zinc oxide (IZO). When power is applied to the gate electrode and the source electrode of the thin film transistor and thus the thin film transistor is turned on, an electric field is formed between the pixel electrode of the TFT substrate 11 and the common electrode of the color filter substrate 12. An alignment angle of the liquid crystals injected between the TFT substrate 11 and the color filter substrate 12 is changed due to the electric field, and the light transmittance is changed depending on the changed alignment angle such that a desired pixel can be acquired.

An integrated circuit chip 13 is mounted on the TFT substrate 11 to control the liquid crystal display panel 10. The integrated circuit chip 13 generates a plurality of timing signals for applying a gate driving signal and a data driving signal with appropriate timing, and then respectively applies the signals to the gate lines and the data lines of the liquid crystal display panel 10.

In order to polarize light passing through the liquid crystal display panel 10, polarizing plates may further be attached to both sides of the liquid crystal display panel 10.

A backlight unit is formed in a lower portion of the liquid crystal display panel 10 to irradiate light to liquid crystal display panel 10. The backlight unit according to the present embodiment includes a light source 40, a light guiding plate 30 guiding light from the light source 40 for emission to a specific direction, and an optical sheet 20 stacked on an upper portion of the light guiding plate 30. In the present embodiment, a light emitting diode (LED) is used as the light source. However, other light sources may be used. The number of light sources 40 may be variously changed according to the size and usage of the LCD 100. In addition, the backlight unit may further include a reflection sheet 50 disposed in a lower portion of the light guiding plate 30 such that the reflection sheet 50 is arranged facing a bottom surface 33 of the light guiding plate 30.

The liquid crystal display panel 10 and the backlight unit including the light source 40 and the light guiding plate 30 are received in the receiving container 60. The liquid crystal display panel 10 and the backlight unit are received in one receiving container 60 in the present embodiment, but an upper chassis or a lower chassis may further be formed in order to supplement the strength of the receiving container 60. Alternatively, the receiving container 60 may be formed by integrally forming a chassis formed with as a strong steel use stainless (SUS) and a mold formed of a buffering material through injection molding. As described, the structure of the receiving container for receiving the liquid crystal display panel 10 and the backlight unit can be variously changed, and thus the present invention is not limited to the drawing.

Figure 2:
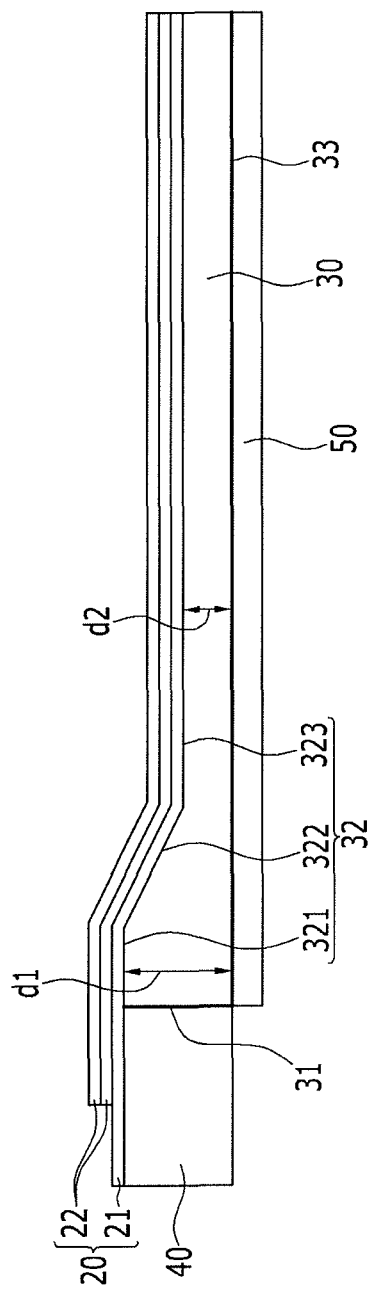
FIG. 2 is a side view showing an assembled state of a backlight unit of the liquid crystal display of FIG. 1.

FIG. 2 is a side view showing an assembled state of the backlight unit of the LCD of FIG. 1, and the backlight unit according to the present embodiment will be described in further detail.

In one embodiment, the light source 40 is formed of a plurality of light emitting diodes (LEDs) formed in the dot-shaped light source, and is disposed at one side of the light guiding plate 30 and generates light. In addition, the reflection sheet 50 is formed in a size corresponding to the bottom surface 33 of the light guiding plate 30, and reflects light leaked to the bottom surface 33 of the light guiding plate 30 to the light guiding plate 30 side to thereby improve light efficiency of the backlight unit.

The light guiding plate 30 is arranged facing the light source 40, and includes an incoming surface 31 on which light generated from the light source 40 is incident, an upper surface 32 substantially perpendicularly extended from one end of the incoming surface 31, and the bottom surface 33 facing the upper surface 32. Here, the upper surface is sequentially partitioned into a guiding surface 321, an inclined surface 322, and an emission surface 323 from the incoming surface 31.

The guiding surface 321 is extended from one end of the incoming surface 31, and a thickness d1 from the guiding surface 321 to the bottom surface 33 is substantially the same as the thickness of the light source 40. That is, the thickness d1 from the guiding surface 321 to the bottom surface 33 is substantially the same as the height of the incoming surface 31, and this is determined by the thickness of the light source 40. In addition, the emission surface 323 is a surface that light incident from the incoming surface 31 is substantially perpendicularly to the bottom surface 33 of the light guiding plate 30, and a thickness d2 from the emission surface 323 to the bottom surface 33 may be smaller than the thickness d1 from the guiding surface 321 to the bottom surface 33. With such a configuration, the light guiding plate 30 may further be thinner.

Here, the thickness d1 and the thickness d2 are different from each other such that a step may be generated. The emission surface 323 and the guiding surface 321 are connected by the inclined surface 322. That is, the inclined surface 322 is extended from the guiding surface 321 and then connected to the emission surface 323, and inclined with a predetermined angle.

A plurality of optical sheets 20 are stacked on the upper surface 32 of the light guiding plate 30 to make light passing through the light guiding plate 30 substantially perpendicularly incident on the liquid crystal display panel. In further detail, the optical sheets 20 include a diffusion sheet 21 and a pair of prism sheets 22, but the present invention is not limited thereto. The optical sheets 20 may further include various configurations (e.g., protection sheet) known to a person skilled in the art.

The diffusion sheet 21 is provided for diffusion of light emitted from the emission surface 323, and covers the entire upper surface 32 of the light guiding plate 30, that is, not only the emission surface 323 but also the inclined surface 322 and the guiding surface 321. Further, as shown in FIG. 2, the diffusion sheet 21 may be extended to cover the entire upper surface of the light source 40.

The prism sheet 22 is disposed on the diffusion sheet 21 to collect light toward a frontward direction. The prism sheet 22 is formed to cover the entire upper surface 32 of the light guiding plate 30, that is, the emission surface 323, the inclined surface 322, and the guiding surface 321. Further, as shown in FIG. 2, the prism sheet may be extended to partially cover the upper surface of the light source 40 to cover an upper portion of a portion where a light emission surface of the light source 40 is arranged facing the incoming surface 31 of the light guiding plate 30.

As described, the diffusion sheet 21 and the prism sheet 22 cover not only the emission surface 323 but also the inclined surface 322 and the guiding surface 321 of the light guiding plate 30, and further cover a portion where the incoming surface 31 of the light guiding plate 30 and a light emission portion of the light source 40 are arranged facing each other and the upper surface of the light source 40 so that light leaked through the guiding surface 321 or the inclined surface 322 among light incident from the light source 40 may be transmitted back to the light guiding plate 30 or enters to a portion corresponding to an activated area of the liquid crystal display panel. The effect of preventing light leakage according to the present embodiment will be described in further detail with reference to a comparative example shown in FIG. 4 and FIG. 5.

Figure 3:
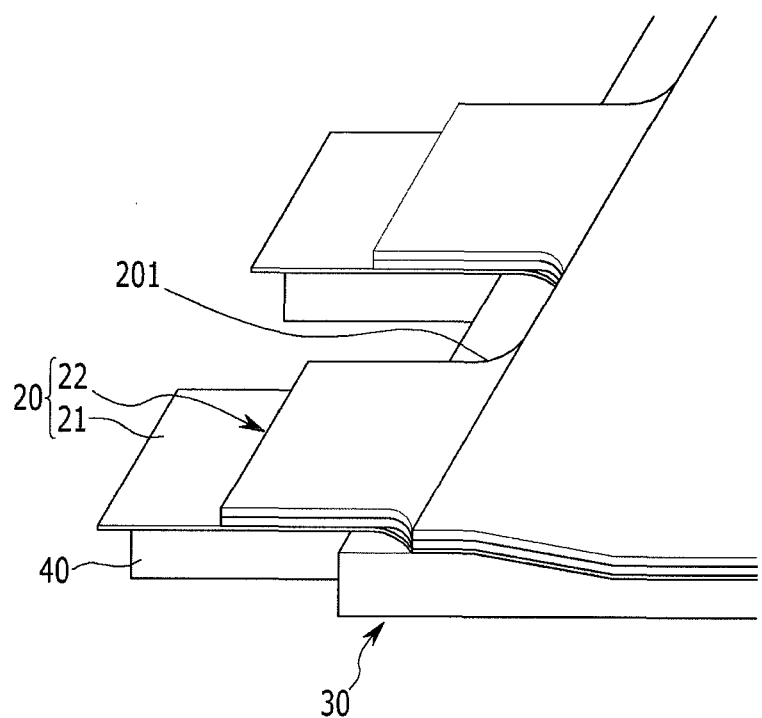
FIG. 3 is a partially perspective view of the backlight unit according to one embodiment.

FIG. 3 is a partially perspective view of the backlight unit according to an embodiment. Referring to FIG. 3, the optical sheet 20 is provided with a cut-out portion 201 formed between the light sources 40 such that the optical sheet 20 is formed only in the upper surface of the light source 40 and not formed between the plurality of light sources 40. With such a configuration, other parts (not shown) added between the light sources 40 may prevent the optical sheet 20 covering the light sources 20 from coming off.

Figure 4:
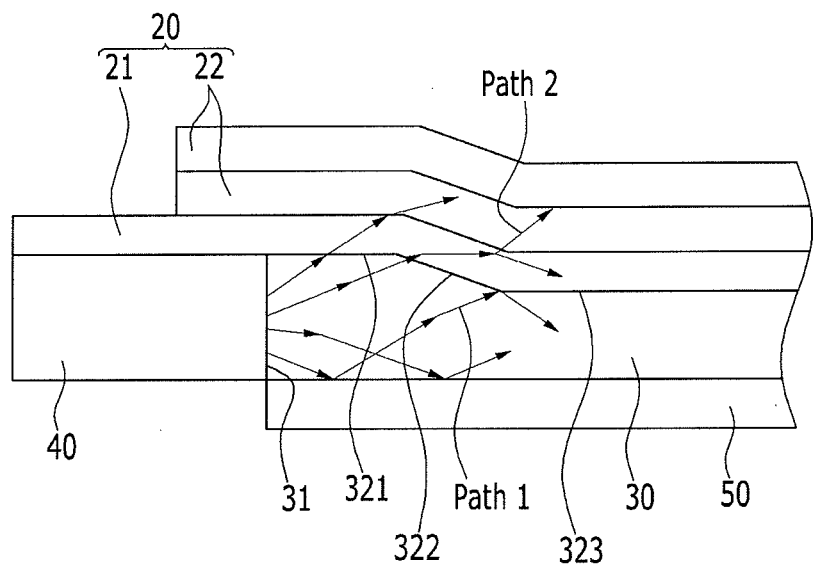
FIG. 4 shows a light path in the backlight unit according to one embodiment.

FIG. 4 shows a light path in the backlight unit according to an embodiment. Referring to FIG. 4, leakage of light incident toward the guiding surface 321 or the inclined surface 322 among light incident from the light source 40 may be prevented by the above configuration. That is, light incident toward the guiding surface 321 or the inclined surface 322 is transmitted back to the light guiding plate 30 by the diffusion sheet 21 or the prism sheet 22 covering the inclined surface 322 and the guiding surface 321 (path 1), or emitted to an area corresponding to an activated area of the liquid crystal display panel 10 (path 2). Since light leakage through the inclined surface 322 and the guiding surface 321 can be prevented, efficiency of the backlight unit can be improved and accordingly luminance of the LCD 100 can be improved.

Figure 5:
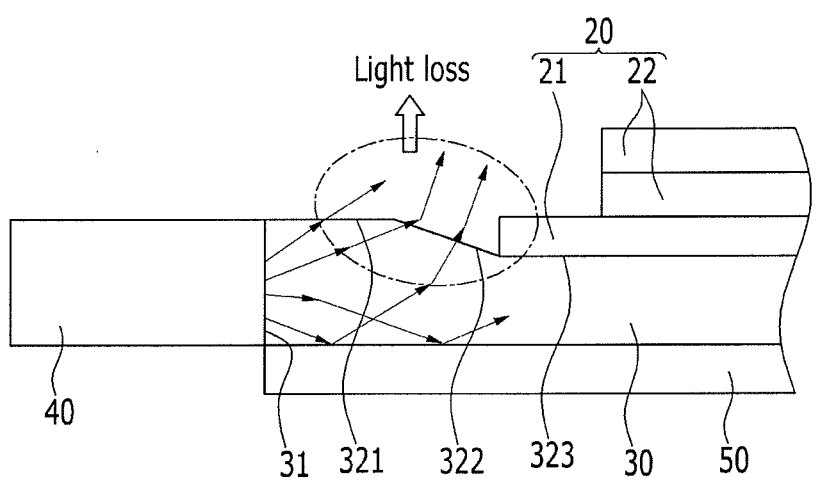
FIG. 5 shows a light path of a backlight unit according to a comparative example.

FIG. 5 shows a light path in a backlight unit according to a comparative example. A plurality of optical sheets 20 are formed only in an emission surface 323 of a light guiding plate 30. In this configuration, light incident through an incoming surface 31 is leaked through an inclined surface 322 and a guiding surface 321.

In order to determine improvement of LCD luminance, comparative luminance measurements of an LCD were made. The measurement result is shown in Table 1. In table 1, "whole" denotes an average value of luminance measured at nine spots in the LCD 100, and "center" denotes a luminance value measured at the center spot of the nine spots. Further, this measurement is performed five times respectively for the embodiment and the comparative example.

maintained and simultaneously light leakage can be reduced, thereby improving luminance.

According to least one of the disclosed embodiments, the overall luminance can be improved by preventing light leakage from a guiding surface and an inclined surface of a portion where the guiding plate and the light source contact each other while maintaining the shape of the thin light guiding plate.

While embodiments have been described in connection with the accompanying drawings, it is to be understood that various modifications and equivalent arrangements are included within the spirit and scope of the appended claims.

What is claimed is:

1. A backlight unit comprising:
   a light source configured to generate light;
   a light guiding plate including i) an incoming surface configured to receive the light from the light source, ii) an upper surface substantially perpendicularly extended with respect to the incoming surface, and iii) a bottom surface arranged so as to face the upper surface; and
   an optical sheet formed on the light guiding plate,
   wherein the upper surface of the light guiding plate includes a guiding surface, an inclined surface, and an emission surface sequentially arranged close to the incoming surface of the light guiding plate,
   wherein the optical sheet covers at least the inclined surface and the guiding surface,
   wherein the light source comprises a plurality of sub-light sources, and wherein the optical sheet includes a cut-out portion formed between the sub-light sources.

2. The backlight unit of claim 1, wherein the optical sheet at least partially covers an upper surface of the light source.

3. The backlight unit of claim 1, wherein the optical sheet comprises a diffusion sheet and a prism sheet formed on the diffusion sheet.

4. The backlight unit of claim 3, wherein the diffusion sheet covers the entire upper surface of the light source and wherein the prism sheet covers part of the upper surface of the light source.

5. The backlight unit of claim 1, further comprising a reflection sheet arranged so as to face the bottom surface of the light guiding plate.

6. The backlight unit of claim 1, wherein the light source is a light emitting diode (LED).

7. A liquid crystal display comprising:
   a liquid crystal display panel;
   a backlight unit including i) a light source configured to generate light, ii) a light guiding plate including an

TABLE 1

| | cd/m² | | | | | | | | | |
|---|---|---|---|---|---|---|---|---|---|---|
| | 1 measurement | | 2 measurement | | 3 measurement | | 4 measurement | | 5 measurement | |
| | exemplary embodiment | Comparative Example | exemplary embodiment | Comparative Example | exemplary embodiment | Comparative Example | exemplary embodiment | Comparative Example | exemplary embodiment | Comparative Example |
| whole | 6473 | 5240 | 6504 | 5294 | 6466 | 5355 | 6538 | 5253 | 6467 | 5202 |
| center | 6569 | 5465 | 6588 | 5475 | 6544 | 5544 | 6668 | 5560 | 6552 | 5600 |

According to Table 1, luminance is improved about 13% according to the embodiment, compared to the comparative example.

As described, in the LCD 100 according to the present embodiment, the optical sheet is extended to the guiding surface 321 and the inclined surface 322 of the light guiding plate 30 so that the shape of the thin light guiding plate can be incoming surface configured to receive the light from the light source and an upper surface extending from the incident surface, and iii) an optical sheet formed on the light guiding plate; and
a receiving container configured to receive the liquid crystal display panel and the backlight unit,
wherein the upper surface of the light guiding plate includes a guiding surface, an inclined surface, and an emission surface sequentially arranged close to the incoming surface of the light guiding plate, wherein the optical sheet covers at least the inclined surface and the guiding surface, wherein the light source comprises a plurality of sub-light sources, and wherein the optical sheet includes a cut-out portion formed between the sub-light sources.

8. The liquid crystal display of claim 7, wherein the optical sheet at least partially covers an upper surface of the light source.

9. The liquid crystal display of claim 7, wherein the optical sheet includes a diffusion sheet and a prism sheet formed on the diffusion sheet.

10. The liquid crystal display of claim 9, wherein the diffusion sheet covers the entire upper surface of the light source and wherein the prism sheet covers at least part of the upper surface of the light source.

11. The liquid crystal display of claim 7, wherein the backlight unit further comprises a reflection sheet arranged so as to face a bottom surface of the light guiding plate.

12. The liquid crystal display of claim 7, wherein the light source is a light emitting diode (LED).

\* \* \* \* \*